United States Patent [19]

Keller, II et al.

[11] 4,354,859
[45] Oct. 19, 1982

[54] ENHANCED GAS SEPARATION BY SELECTIVE ADSORPTION

[75] Inventors: George E. Keller, II, South Charleston; Chia-Huei A. Kuo, Charleston, both of W. Va.

[73] Assignee: Union Carbide Corporation, Danbury, Conn.

[21] Appl. No.: 290,484

[22] Filed: Aug. 6, 1981

[51] Int. Cl.³ .............................................. B01D 53/04
[52] U.S. Cl. .......................................... 55/25; 55/68; 55/74; 55/387
[58] Field of Search ................... 55/25, 26, 58, 62, 68, 55/74, 75, 179, 180, 387, 389

[56] References Cited

U.S. PATENT DOCUMENTS

| | | | |
|---|---|---|---|
| 3,121,625 | 2/1964 | Broughton | 55/58 |
| 3,149,934 | 9/1964 | Martin | 55/58 |
| 3,164,454 | 1/1965 | Wilson | 55/68 |
| 3,176,444 | 4/1965 | Kiyonaga | 55/26 |
| 3,192,686 | 7/1965 | Berkey et al. | 55/62 X |
| 3,236,028 | 2/1966 | Rutan | 55/62 X |
| 3,242,645 | 3/1966 | de Montgareuil et al. | 55/58 |
| 3,430,418 | 3/1969 | Wagner | 55/25 |
| 3,619,984 | 11/1971 | Domine et al. | 55/58 X |
| 3,986,849 | 10/1976 | Fuderer et al. | 55/25 |
| 4,011,065 | 3/1977 | Munzner et al. | 55/25 |
| 4,169,715 | 10/1979 | Eriksson | 55/389 X |
| 4,194,891 | 3/1980 | Earls et al. | 55/26 |
| 4,194,892 | 3/1980 | Jones et al. | 55/58 |

Primary Examiner—Robert H. Spitzer
Attorney, Agent, or Firm—Alvin H. Fritschler

[57] ABSTRACT

Gas separation is facilitated by imposing cyclic gas flow and pressure variations on a gas mixture in an adsorption column from the opposite ends thereof. By employing specified relative volume displacements and phase angles for such cyclic variations, the productivity of desired product is enhanced.

19 Claims, 3 Drawing Figures

FIG. I

ENHANCED GAS SEPARATION BY SELECTIVE ADSORPTION

BACKGROUND OF THE INVENTION

1. Field of the Invention

The invention relates to the separation of gases in an adsorption column. More particularly, it relates to enhanced product recovery in selective adsorption operations.

2. Description of the Prior Art

Gas mixtures can be separated by well known selective adsorption techniques. One such technique is the pressure swing adsorption (PSA) process that has been successfully employed for a variety of commercial gas separation operations, including PSA-hydrogen purification, PSA-oxygen recovery, PSA methane recovery and the like. This process commonly includes the steps of high pressure adsorption, concurrent depressurization, countercurrent depressurization, purge and repressurization. The PSA process was disclosed in the Kiyonaga patent, U.S. Pat. No. 3,176,444. The process has been further developed with respect to embodiments employing a number of adsorbent beds arranged in parallel flow relationship, as disclosed in the Wagner patent, U.S. Pat. No. 3,430,418 and the Fuderer patent, U.S. Pat. No. 3,986,849.

For some applications, it has been found desirable to employ a process overcoming the relatively long cycle times of the PSA process. As a result, a rapid pressure swing adsorption process (RPSA) was developed for use in certain oxygen production operations and for other commercial gas separation processes. The RPSA process and system are described in the Earls et al. patent, U.S. Pat. No. 4,194,891, and in the Jones et al. patent, U.S. Pat. No. 4,194,892. As disclosed in such patents, the RPSA process can be operated at very rapid processing cycles, e.g. less than 30 seconds, to achieve relatively high adsorbent productivity and product recovery.

While the RPSA process is capable of achieving greater productivity than the PSA process, this increased productivity is accompanied by correspondingly high operating, e.g. power, costs. It is desirable in the art to achieve such increased productivity accompanied by a decrease in the operating costs of the adsorbent system. In addition, of course, it is always desirable in the art to develop a process and system for enhancing the separation of gases at such higher productivity levels and at reduced levels of operating cost.

It is an object of the invention, therefore, to provide an improved process and apparatus for the separation of gas mixtures.

It is another object of the invention to provide a means for enhancing the production of desired product in selective adsorption operations.

It is a further object of the invention to provide a process and apparatus for enabling productivity to be increased at reduced operating costs in the selective adsorption processing of gas mixtures.

With these and other products in mind, the invention is hereinafter described in detail, the novel features thereof being particularly pointed out in the appended claims.

SUMMARY OF THE INVENTION

Enhanced separation of a gas mixture and increased production of desired product are achieved in a selective adsorption process in which cyclic gas flow and pressure variations are imposed on the gas mixture from opposite ends of an adsorption column. The volume displacements imposed at said opposite ends of the column are dissimilar, with the ratio of the smaller to the larger cyclic displacement being from about 0.15 to about 0.65. The phase angle of the unequal cyclic displacements can vary within specified limits. Thus, the smaller cyclic volume displacement means will impose flow and pressure variations at a phase angle of from about 15° lag to about 75° lead relative to such variations imposed by the larger cyclic volume displacement means.

BRIEF DESCRIPTION OF THE DRAWINGS

The invention is hereinafter described in detail with reference to the accompanying drawings in which.

DETAILED DESCRIPTION OF THE INVENTION

Figure 1:
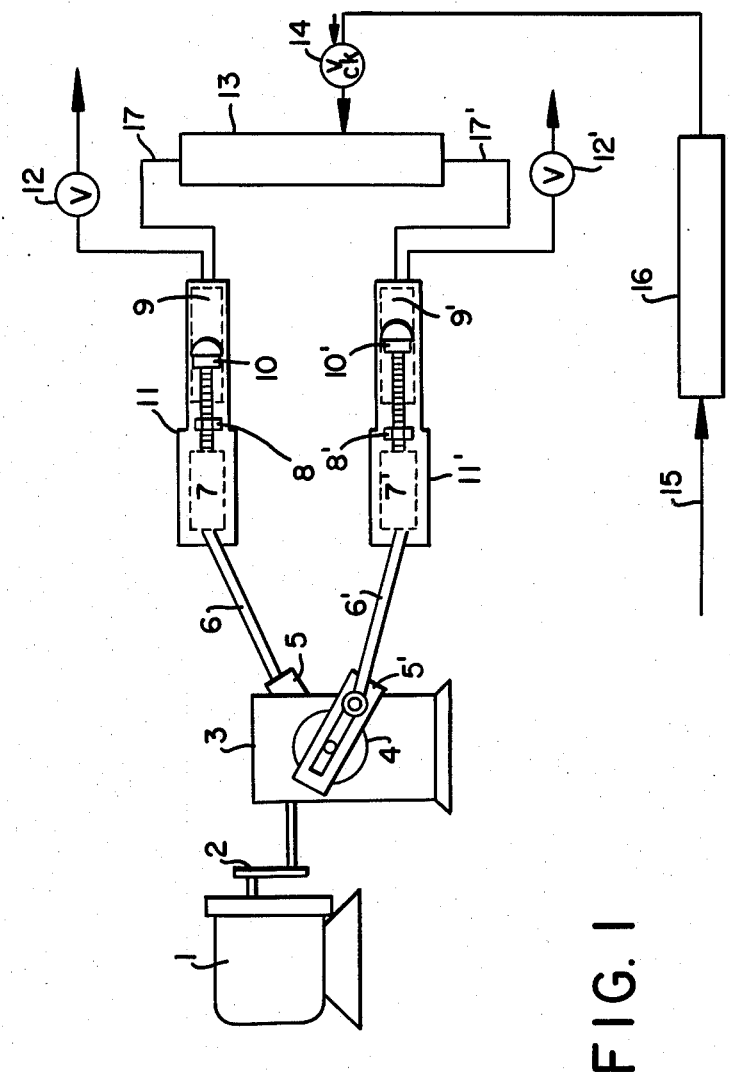
FIG. 1 is a schematic drawing illustrating an embodiment of the invention employing pistons as the means for imposing cyclic gas flow and pressure variations of the invention on the gas mixture in an adsorption column.

The objects of the invention are accomplished by employing cyclic volume displacement means at opposite ends of an adsorption column, said cyclic means having different displacements and specified phase angles. The resulting gas flow and pressure variations result in a high productivity separation of the components of a gas mixture in an improved selective adsorption operation. The enhanced separation of the gas mixture and the increased production of desired product are accomplished by the achieving of a rapid cycling, pressure swing adsorption effect that tends to permit a reduction in operating costs as compared with conventional PSA operations.

In one convenient embodiment of the invention, driving pistons in fluid communication with each end of an adsorption column are employed as the means for imposing cyclic gas flow and pressure variations on the gas mixture being separated in the column. Pistons have heretofore been employed as compression means to furnish a gas mixture at elevated pressure to an adsorption column, as evidenced by the Broughton patent, U.S. Pat. No. 3,121,625, and the Eriksson patent, U.S. Pat. No. 4,169,715. When the two piston embodiment of the invention is operated with no movement of one piston, converting the operation to such a one-piston type technique, performance was found to drop significantly vis-a-vis operation in accordance with the practice of the invention.

In the gas separation process of the invention, a gas mixture to be separated is introduced to an adsorption column at one of the two ends of the column or at an intermediate point between the opposite ends thereof. The column will be understood to contain an adsorbent capable of selectively adsorbing the more readily adsorbable gas component of a gas mixture. Cyclic gas flow and pressure variations are imposed on the gas mixture in the column from a first end thereof by a first, larger cyclic volume displacement means. Cyclic gas flow and pressure variations are also imposed on the gas mixture in said column, at the same time, from the second end thereof by a second, smaller cyclic volume displacement means. The different cyclic displacements affected at opposite ends of the column, coupled with the disclosed phase relationships of the cyclic gas flow and pressure variations, serve to produce specific pressure and flow pulsations within the column which, in turn, result in the advantageous gas separation effect achieved in the practice of the invention.

For purposes of the invention, the ratio of the volume displacement produced by the second, smaller cyclic volume displacement means to that of the first, larger cyclic volume displacement means is generally within the range of from about 0.15 to about 0.65. In preferable embodiments of the invention, this volume of second displacement means to first displacement means is from about 0.25 to about 0.50. It will be understood that the desired volume displacement can be achieved in any convenient manner compatible with the form of volume displacement means employed in any particular embodiment of the invention. When driving pistons are employed, for example, the desired volume displacement can be achieved by adjusting the stroke of a given diameter piston. Alternately, a larger or smaller diameter piston can be employed, with the stroke thereof made shorter or longer, as required, to provide the desired volume displacement.

In addition to such relative piston displacement, the invention requires that the phase angle between the driving pistons or other cyclic volume displacement means be maintained within the range of phase angles herein disclosed and claimed. The second, smaller cyclic volume displacement means thus imposes, in the practice of the invention, cyclic flow and pressure variations relative to those imposed by said first, larger displacement means at a phase angle within the range of from about 30° lag to about 90° lead. This phase angle, which has a significant effect on the degree of separability of a gas mixture, is preferably from about 15° lag to about 75° lead, more preferably from about 30° lead to about 45° lead. As used herein, the term "lead" will be understood to mean that the second, smaller cyclic means begins moving toward the bed and continues to move throughout its operating cycle before the corresponding beginning of movement toward the bed and the continued movement of the first, larger cyclic means throughout its 360° operating cycle.

In the embodiment of the invention illustrated in FIG. 1 of the drawings, motor 1 having a variable speed control and connected to reduction gear box 3 by means of chain drive 2 is used to drive pistons 11 and 11'. Split hub 4 mounted on each side of said gear box 3 is used to adjust the phase angle between the two pistons. The piston stroke length is adjusted by means of piston arms 6 and 6', which are attached to hub 4 by means of stroke length adjustment bars 5 and 5'. The pistons, 11 and 11' comprise said piston arms 6 and 6', piston guides 7 and 7', the piston end volume adjustment nuts 8 and 8' and piston heads 10 and 10'. The piston end volume adjustment nuts are used to adjust the end surge volumes 9 and 9' of the pistons.

The gas mixture to be separated is passed in line 15 to dryer 16 and check valve 14 from which it is fed to adsorption column 13 at an intermediate point between the ends of the column. The column contains a bed of adsorbent material capable of selectively adsorbing the more readily adsorbable gas component of the gas mixture. Control valves 12 and 12' are used to control product purity and flow rate at each end of adsorbent column 13. In the cyclic operation of pistons 11 and 11', cyclic gas flow and pressure variations are imposed on the gas mixture in column 13 from opposite ends thereof by means of a fluid communication through lines 17 and 17', respectively.

Those skilled in the art will appreciate that various changes and modifications can be made in the embodiment shown in FIG. 1 while remaining within the scope of the invention. For example, two or more adsorption columns can be employed, and each piston assembly can be adapted to serve more than one adsorption column. While the drawing shows driving pistons in fluid communication with each end of the column, it will be appreciated that any other suitable gas moving means can be employed to impose the necessary cyclic gas flow and pressure variations from the opposite ends of the column. Movable diaphragms in fluid communication with each end of the column, or combinations of compressors and surge tanks are examples of other means that can be employed to achieve the advantageous gas flow and pressure variations of the invention.

The effect of the relative volume displacement produced at opposite ends of the adsorption column was demonstrated in apparatus corresponding to that shown in FIG. 1. Comparative runs were made with one piston adjusted to provide a larger, cyclic volume displacement, while the other piston provided a smaller, cyclic volume displacement with the relative piston displacements being varied at a fixed phase angle of 45° lead, i.e. with the short displacement piston leading the long displacement piston by said 45°. Each piston had a diameter of 4 inches and a piston frequency of 48–50 RPM. The feed gas employed was dry air at a feed pressure of 15 psig. The adsorption column employed was about 1.05 inches inside diameter and 9 inches long with the feed point being 3 inches from the long, i.e. larger, piston displacement end of the column. The column was filled with 93 grams of a suitable adsorbent in the form of 40×80 13× molecular sieve millibeads.

Figure 2:
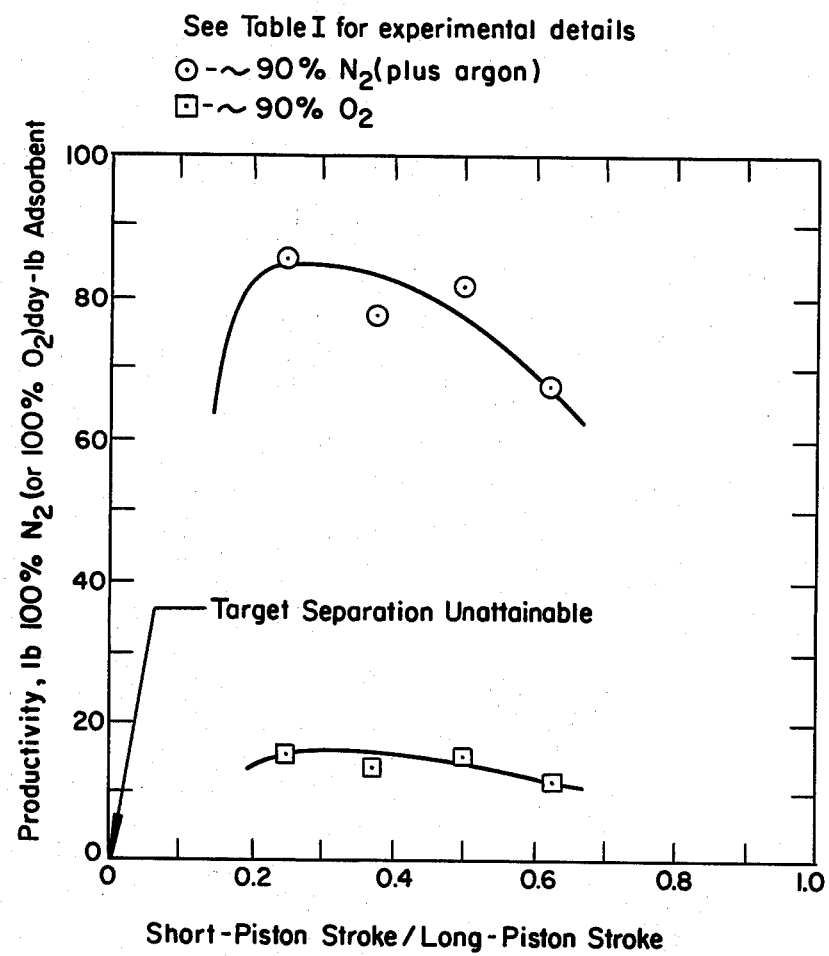
FIG. 2 is a graph illustrating the effect of the volume displacement ratio on bed productivity in the practice of the invention utilizing the apparatus of FIG. 1.

The apparatus was operated under the conditions above so that the air introduced into the column was passed rapidly back and forth therein as a result of the cyclic gas flow and pressure variations imposed from opposite ends of the column. The results, at various relative piston displacements, were as shown in Table I below and as illustrated in FIG. 2 of the drawings:

TABLE I

EFFECT OF RELATIVE CYCLIC VOLUME DISPLACEMENT ON ADSORPTION COLUMN PRODUCTIVITY

| Piston Stroke Length/inches | | Flow Rate Std. Liters/hr. | | | Product Purity, Mol % O$_2$ | | Productivity* | |
|---|---|---|---|---|---|---|---|---|
| Long | Short | Total | Long Piston | Short Piston | Long Piston | Short Piston | N$_2$ | O$_2$ |
| 4 | 0 | 22.6 | 18.9 | 3.7 | 9.7 | 77.7 | 5.5 | 1.1 |
| 4 | 1.0 | 340.0 | 292.7 | 47.3 | 9.8 | 90.0 | 85.2 | 15.7 |
| 4 | 1.5 | 305.1 | 264.5 | 40.6 | 9.7 | 90.5 | 77.1 | 13.6 |
| 4 | 2.0 | 324.9 | 278.6 | 46.3 | 9.4 | 89.4 | 81.5 | 15.3 |
| 4 | 2.5 | 269.0 | 232.5 | 36.5 | 9.9 | 89.5 | 67.6 | 12.0 |

*Productivity = lb. 100% Gas/lb. Adsorbent-Day, calculated as (Std. liters/hr) (Mol fraction major component)(Molecular weight major component) (Bed weight, gm)$^{-1}$(22.4 liters/mole)$^{-1}$ (24 hrs/day).

FIG. 2 will be seen to demonstrate that productivity is dependent on the ratio of the volume displacement produced by smaller cyclic displacement means to said displacement produced by the larger cyclic displacement means. It should be noted that, with no movement of the short piston, the indicated ratio will be zero, corresponding to a one-piston operation as referred to above. With no movement of the short piston, FIG. 2 and Table I indicate that the highly desirable target separation goal of 90 mol % oxygen recovered in the stream withdrawn from one of the columns and 90 mol % of nitrogen plus argon recovered from the opposite end of the column cannot be met. With movement of the short piston sufficient to result in volume displacement ratios within the range indicated above and in the claims, on the other hand, the target separation can readily be made and at desirable productivity levels.

The effect of the phase angle between the smaller and the larger volume displacement means was demonstrated in a series of comparative runs intended to separate air into a 90 mol % nitrogen plus argon/10% oxygen stream and a 90 mol % oxygen/10% nitrogen plus argon stream. The diameters of the pistons employed in apparatus corresponding to that shown in FIG. 1 were each 4 inches. The piston stroke length of the short piston was 1 inch, while that of the long piston was 4 inches. Thus, the volume displacement ratio was fixed at 0.25. The frequency of the pistons was 45-50 RPM. The feed gas employed was dry air at a feed pressure of 15 psig. The adsorption column and the adsorbent employed were as set forth above with respect to the runs demonstrating the effect of relative volume displacement.

Figure 3:
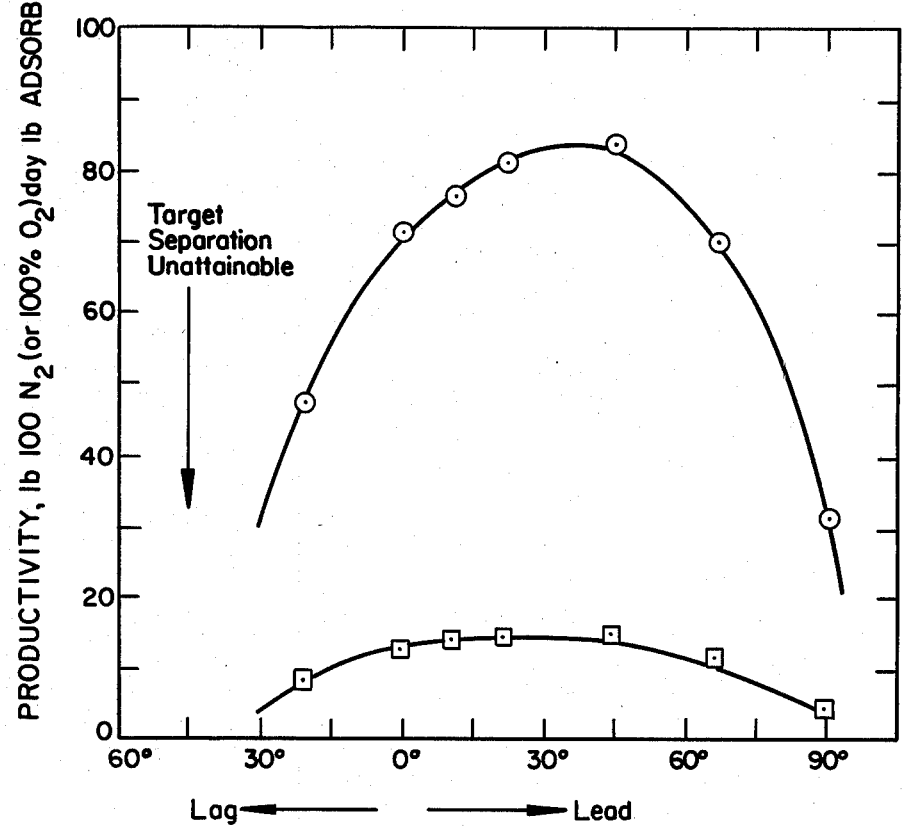
FIG. 3 is a graph illustrating the effect of the phase angle of cyclic volume displacement on bed productivity in the practice of the invention in the apparatus of FIG. 1.

Upon operation of the apparatus under such conditions above, the feed air introduced into the column was passed back and forth therein as a result of the cyclic gas flow and pressure variations imposed from opposite ends of the column. The results, at various piston phase angles, were as shown in Table II below and as illustrated in FIG. 3 of the drawings:

TABLE II

EFFECT OF PISTON PHASE ANGLE VARIATIONS ON ADSORPTION COLUMN PRODUCTIVITY

| Phase Angle Long vs Short Piston | Flow Rate Std. Liters/hr. | | Product Purity Mol % $O_2$ | | Productivity* | |
|---|---|---|---|---|---|---|
| | Total | Long Piston | Short Piston | Long Piston | Short Piston | $N_2$ | $O_2$ |
| 90° lead | 126.1 | 113.2 | 12.9 | 12.8 | 90.1 | 31.9 | 4.3 |
| 67° lead | 279.7 | 243.5 | 36.2 | 10.7 | 90.0 | 70.2 | 12.0 |
| 45° lead | 332.4 | 286.3 | 46.1 | 10.0 | 89.8 | 83.2 | 15.3 |
| 22° lead | 324.6 | 280.3 | 44.3 | 10.1 | 89.9 | 81.3 | 14.7 |
| 11° lead | 305.3 | 263.2 | 42.1 | 9.8 | 91.0 | 76.6 | 14.1 |
| 0 | 282.9 | 244.8 | 38.1 | 9.7 | 90.5 | 71.3 | 12.7 |
| 20° lag | 188.8 | 162.8 | 26.0 | 9.4 | 91.0 | 47.6 | 8.7 |
| 45° lag | 111.6 | 98.0 | 13.6 | 18.7 | 35.0 | 25.7 | 1.8 |

*Productivity = lb. 100% gas/lb. Adsorbent-Day, calculated as (Std liters/hr) (Mol fraction major component) (Molecular weight major component) (Bed weight. gm)$^{-1}$ (22.4 liters/mole)$^{-1}$ (24 hrs/day).

FIG. 3 will be seen to demonstrate that the phase angle has a very significant effect on productivity. It should be noted that the use of phase angles slightly outside the range indicated above can be used to achieve separation but at sharply decreased productivity levels. While such slight deviations are deemed within the scope of the invention as described and claimed, it should be noted that, at 45° lag, the desired target separation cannot be achieved. Similarly, the separation cannot be achieved much beyond 90° lead.

With the use of phase angles within the ranges indicated above and in the claims, however, the target separation can readily be achieved, with productivity being optimized at the preferred phase angle ranges recited.

The invention can be applied for any desirable gas separation operation for which an absorbent material is capable of selectively adsorbing a more readily adsorbable gas component or components from the less readily absorbable gas component or components. Thus, the invention can be employed for separating oxygen and nitrogen in air separation units ranging from new medical oxygen units or similar relatively small-scale application units up to tonnage oxygen and nitrogen units. Hydrogen recovery/separation units, as for the recovery of hydrogen from methane, carbon monoxide or other gases, can also advantageously be carried out in the practice of the invention. Other applications of the invention include, but are not limited to, cracked gas separations, such as the low-pressure removal of hydrogen and methane from cracked gas, $C_2H_4/C_2H_6$ and $C_3H_6/C_3H_8$ separations, and the treating of vent gas streams, e.g. purging of inerts therefrom and returning reactants and products for further processing.

The invention is hereinafter described with reference to particular illustrative examples thereof. It will be appreciated that such examples are presented for purposes of more fully illustrating the practice of the invention, but should not be construed as limiting the scope of the invention as set forth in the appended claims.

EXAMPLE 1

Employing apparatus as shown in FIG. 1, a 15 psig air stream was fed to the middle of a 1.049-inch inside diameter, 8.75-inch long adsorbent bed containing 82.55 grams of 13× molecular sieve adsorbent, ground and screened at 40/80 mesh. Each piston was 1¾ inch in diameter and had a 2-inch length. The end surge volume, i.e. the volume left in the cylinder when the piston was furthest into the cylinder, was 0.6 cubic inches. The long stroke piston had a stroke length of 3 inches, while the short stroke piston had a stroke length of one inch. The phase angle between the cyclic 360° operation pistons was such that the short stroke piston lead the long stroke piston by 45°. The piston frequency was 30 RPM. Virtually complete separation was achievable, as is shown in the results of Table III below, demonstrating the highly desirable result and advantage of producing two pure products, a 99 plus % nitrogen stream and a 95% oxygen stream, vis-a-vis the single pure product generally obtainable in conventional PSA processing.

TABLE III

AIR SEPARATION - EFFECT OF DESIRED PRODUCT PURITY

| Flow Rate Std. Liters/hr. | | | Product Purity % | | Productivity lb./lb. Adsorbent-Day | | Recovery % | |
|---|---|---|---|---|---|---|---|---|
| Total | Long Piston | Short Piston | Long Piston $N_2$ | Short Piston $O_2$ | $N_2$ | $O_2$ | $N_2$ | $O_2$ |
| 15.57 | 12.15 | 3.42 | 99.9 | 95.0 | 4.42 | 1.35 | 98.5 | 99.8 |
| 18.36 | 14.61 | 3.75 | 97.8 | 94.0 | 5.20 | 1.47 | 98.4 | 91.9 |
| 24.99 | 20.75 | 4.24 | 95.7 | 89.2 | 7.23 | 1.57 | 100.4 | 72.4 |
| 30.14 | 25.07 | 5.07 | 92.0 | 82.0 | 8.40 | 1.75 | 96.7 | 65.9 |
| 38.29 | 32.12 | 6.17 | 89.0 | 70.2 | 10.40 | 1.80 | 94.4 | 54.2 |

The results as set forth in said Table III also demonstrated that, when such very high purity levels for both products can be relaxed, the advantageously high productivity levels of the invention can be enhanced for a given phase angle and volume displacement ratio embodiment of the invention.

EXAMPLE 2

The process as carried out in Example 1 was repeated except that a 7-inch long bed containing 51.15 grams of A-BAC (Bead Activated Carbon), ground and screened to 40/80 mesh, was employed as the adsorbent. A 15 psig $H_2/CH_4$ (50/50%) mixture was fed to the middle of the adsorbent bed. The results, as shown in Table IV below, will be seen to confirm that nearly pure hydrogen and methane, i.e. 99%, streams can readily be recovered from an $H_2/CH_4$ (50/50%) mixture in the practice of the invention.

TABLE IV
$H_2/CH_4$ SEPARATION - EFFECT OF DESIRED PRODUCT PURITY

| Flow Rate Std. Liters/hr. | | | Product Purity % | | Productivity lb./lb. Adsorbent-Day | | Recovery % | |
|---|---|---|---|---|---|---|---|---|
| Total | Long Piston | Short Piston | Long Piston $CH_4$ | Short Piston $H_2$ | $CH_4$ | $H_2$ | $CH_4$ | $H_2$ |
| 15.01 | 7.26 | 7.75 | 100.0 | 99.0 | 2.44 | 0.33 | 96.7 | 100.2 |
| 21.28 | 10.51 | 10.77 | 98.0 | 96.1 | 3.46 | 0.44 | 96.8 | 97.4 |
| 28.54 | 14.24 | 14.30 | 94.1 | 92.2 | 4.51 | 0.56 | 93.9 | 92.4 |

As in Example 1, productivity is enhanced in those cases in which such very high purity is not required.

EXAMPLE 3

The operation described above with respect to Example 1 was repeated except that the phase angle was varied. The results were as shown in Table V below:

TABLE V
AIR SEPARATION - EFFECT OF PHASE ANGLE

| Phase Angle Short vs Long Piston | Flow Rate Std. Liters/hr. | | | Product Purity % | | Productivity lb./lb. Adsorbent-Day | |
|---|---|---|---|---|---|---|---|
| | Total | Long Piston | Short Piston | Long Piston $N_2$ | Short Piston $O_2$ | $N_2$ | $O_2$ |
| 45° lead | 15.57 | 12.15 | 3.42 | 99.9 | 95.0 | 4.42 | 1.35 |
| 90° lead | 9.97 | 7.97 | 2.0 | 98.5 | 94.0 | 2.86 | 0.78 |
| 45° lag | 5.94 | 2.41 | 3.53 | 55.0 | 1.6 | 1.26 | 1.0 |

Whereas it had earlier been seen that a 99.9% nitrogen stream can be produced at the long-stroke piston end of the column and that a 95.0% oxygen stream can at the same time be produced at the short-stroke piston end thereof, at a short piston lead of 45°, it has been demonstrated, that at a phase angle of short piston 45° lag, a nearly pure nitrogen stream, rather than oxygen, is produced from the short-stroke piston end. At the same time, only an approximately 45% oxygen stream can be generated from the long-stroke piston end of the column. This result shows that, while the less readily adsorbable gas component is usually recovered at the short piston end, the apparatus of the invention can be operated under particular conditions so that this effect is reversed, with the more readily adsorbable gas component being recovered at said short piston end of the column. The overall results as shown in Table V further confirm that the phase angle has a significant effect on the productivity and separation achievable in the practice of the invention.

The process of the invention provides a highly desirable advance in the field of gas adsorption. By causing a gas mixture fed to an adsorption column to be passed rapidly back-and-forth within the column under the influence of the varying gas flow and pressure variations imposed from opposite ends of the column, the invention provides for high productivity of separated gas components. This desirable productivity is achieved by means of driving pistons or other means for conveniently imposing gas flow and pressure variations at reduced levels of operating cost, i.e. power cost, as compared, for example, with RPSA processing in which conventional pressure swing adsorption is carried out with very rapid cycle times in order to enhance productivity. The adaptability of the invention, in particular embodiments thereof, to produce pure products at opposite ends of the adsorption column further enhances the significance of the invention in the art. This feature will be understood by those skilled in the art to represent an extremely important advance in the chemical industry.

What is claimed is:

1. An improved pressure swing adsorption process for separating a more readily adsorbable gas component(s) from less readily adsorbable gas component(s) of a gas mixture comprising:
   (a) introducing said gas mixture to an adsorption column, containing an adsorbent capable of selectively adsorbing the more readily adsorbable gas component(s) of said gas mixture, at a point between the opposite ends of the column;
   (b) imposing cyclic gas flow and pressure variations on the gas mixture in said column from a first end thereof by a first, larger, cyclic volume displacement means;
   (c) imposing cyclic gas flow and pressure variations on the gas mixture in said column at the same time from the second end thereof by a second, smaller, cyclic volume displacement means, the ratio of the volume displacement produced by said second means to that of said first means being from about 0.15 to about 0.65, the second means imposing said cyclic flow and pressure variations relative to the flow and pressure variations of said first means at a phase angle within the range of from about 30° lag to about 90° lead;
   (d) withdrawing a gas stream enriched in one said gas component from the first end of the column; and
   (e) withdrawing a gas stream enriched in the other said gas component(s) from the second end of the column, whereby the gas mixture passes rapidly back-and-forth within said column, achieving an enhanced separation of the gas mixture and production of the desired product.

2. The process of claim 1 in which said phase angle for the second displacement means is from about 15° lag to about 75° lead.

3. The process of claim 2 in which said phase angle is from about 30° lead to about 45° lead.

4. The process of claim 1 in which said volume displacement ratio of second means/first means is from about 0.25 to about 0.50.

5. The process of claim 4 in which said phase angle for the second displacement means is from about 15° lag to about 75° lead.

6. The process of claim 5 in which said phase angle is from about 30° lead to about 45° lead.

7. The process of claim 6 in which said volume displacement ratio of second means/first means is from about 0.25 to about 0.50.

8. The process of claim 7 in which said gas mixture comprises air.

9. The process of claim 1 in which said cyclic gas flow and pressure variations are imposed by driving pistons in fluid communication with each end of the column.

10. The process of claim 1 in which said cyclic gas flow and pressure variations are imposed by movable diaphragms in fluid communication with each end of the column.

11. The process of claim 1 in which said gas mixture comprises air, said more readily adsorbable component being nitrogen and said less readily adsorbable component being oxygen.

12. The process of claim 1 in which said gas mixture comprises a mixture of hydrogen and methane, said more readily adsorbable component being methane and said less readily adsorbable component being hydrogen.

13. An improved apparatus for the pressure swing adsorption separation of a more readily adsorbable gas component(s) from a less readily adsorbable gas component(s) of a gas mixture comprising:
  (a) an adsorption column containing an adsorbent capable of selectively adsorbing the more readily adsorbable gas components from less readily adsorbable gas components of a gas mixture;
  (b) inlet means for introducing said gas mixture to the adsorption column at an injection point intermediate between the opposite ends of the column;
  (c) a first, larger, cyclic volume displacement means adapted to impose cyclic gas flow and pressure variations on the gas mixture in said column from a first end portion thereof;
  (d) a second, smaller, cyclic volume displacement means adapted to impose cyclic gas flow and pressure variations on the gas mixture in said column from the second, opposite end portion thereof, the ratio of the volume displacement produced by said second means to that of said first means being from about 0.15 to about 0.65, said second means being adapted for cyclic operation at a phase angle within the range of from about 30° lag to about 90° lead relative to the cyclic flow and pressure variations of said first means;
  (e) discharge means for withdrawing a gas stream enriched in one said gas component(s) from the first end of the column; and
  (f) discharge means for withdrawing a gas stream enriched in the other said gas component(s) from the second end of the column,
whereby the cyclic volume displacement means having the indicated relative volume displacements and phase angles cause a gas mixture introduced to the column to pass rapidly back-and-forth within said column, achieving an enhanced separation of the gas mixture and production of the desired product.

14. The apparatus of claim 13 in which said volume displacement ratio of said second means to that of said first means is from about 0.25 to about 0.50.

15. The apparatus of claim 13 in which said second means is adapted for cyclic operation at a phase angle of from about 15° lag to about 75° lead relative to said first means.

16. The apparatus of claim 15 in which said second means is adapted for cyclic operation at a phase angle of about 30° to about 45° lead.

17. The apparatus of claim 16 in which said volume displacement ratio of said second means to that of said first means is from about 0.25 to about 0.50.

18. The apparatus of claim 13 in which said first and second cyclic volume displacement means comprise piston means in fluid communication with each end of the column.

19. The apparatus of claim 13 in which said first and second cyclic volume displacement means comprise movable diaphragms in fluid communication with each end of the column.

* * * * *